United States Patent [19]

Heider et al.

[11] 4,230,737
[45] Oct. 28, 1980

[54] MARGARINE FAT

[75] Inventors: Henning Heider, Bargteheide; Theophil Wieske, Hamburg, both of Fed. Rep. of Germany

[73] Assignee: Lever Brothers Company, New York, N.Y.

[21] Appl. No.: 958,309

[22] Filed: Nov. 6, 1978

[30] Foreign Application Priority Data

Nov. 10, 1977 [GB] United Kingdom ............... 46842/77

[51] Int. Cl.² .............................................. A23D 5/00
[52] U.S. Cl. .................................................. 426/607
[58] Field of Search ............................... 426/603, 607

[56] References Cited

U.S. PATENT DOCUMENTS

| | | | |
|---|---|---|---|
| 3,607,305 | 9/1971 | Westenberg | 426/607 X |
| 3,796,581 | 3/1974 | Frommhold | 426/607 X |

FOREIGN PATENT DOCUMENTS 1121662 7/1968 United Kingdom .

*Primary Examiner*—Robert A. Yoncoskie
*Attorney, Agent, or Firm*—Michael J. Kelly; James J. Farrell; Melvin H. Kurtz

[57] ABSTRACT

The invention is concerned with margarine fats suitable for the preparation of margarines and low-fat spreads.

The fat blend has a difference in dilatation values at 15° and 25° C. of at least 100 and has a dilatation value at 35° C. of less than 100 and is substantially free from fats other than those containing at least 80% by weight of fatty acid residues with 18 carbon atoms.

Part of the fats are hardened and part of the non-hardened fats are interesterified with hardened fats containing no more than 55% trans-acids. The non-interesterified part of the margarine fat contains non-hardened fats and fats hardened to a trans-content of 50-70%.

3 Claims, No Drawings

MARGARINE FAT

The present invention relates to a margarine fat having a difference in dilatation values at 15° and 25° C. of at least 100 and a dilatation value at 35° C. of no more than 100, which margarine fat is substantially free from fats other than those containing at least 80% by weight of fatty acid residues with 18 carbon atoms. (The dilatation values as described in this specification were measured as described in H. A. Boekenoogen "Analysis and Characterisation of Oils, Fats and Fat Products", Vol. I, 1964, Interscience Publishers, London, p.p. 143 et seq.).

Margarine fats prepared from fats which essentially contain fatty acid residues with a chain length of 18 carbon atoms are disclosed in British Pat. specification No. 1,121,662. In this patent specification margarine fats essentially consisting of non-hydrogenated and hydrogenated non-interesterified and interesterified sunflower oil are described. An essential feature of the invention described in said British patent specification is that most or all of the sunflower oil, including the hardened sunflower oil, is randomly interesterified. The margarine fat disclosed in the British patent specification contains 60-90% of interesterified fats, including at least 75% of the sunflower oil. The high proportion of interesterified fats in the fat blend, solely or essentially consisting of sunflower oil, as disclosed in the British patent specification was regarded necessary in order to overcome the problems of recrystallization, which lead to sandiness and consequently an unpleasant mouthfeel of the margarine prepared from such a fat blend.

The margarine fat of the present invention fulfils the dilatometric requirements indicated above and is substantially free from fats other than those containing at least 80% by weight of fatty acid residues with 18 carbon atoms, part of these fats being hardened and part of the non-hardened fats being interesterified with the hardened fats which contain no more than 55% of trans-acids, the non-interesterified fats containing both non-hardened fats and fats hardened to a trans-content of 50-70%.

In this specification the percentages of fats are by weight and based on the weight of the margarine fat unless otherwise indicated; the percentage of fatty acid residues in a particular fat is based on the total weight of the fatty acid residues in said fat. The term "fat" is used for a triglyceride mixture that is solid at 5°-10° C., except when indicated that it is non-hardened; in that case the term "fat" refers to a triglyceride mixture that is liquid at that temperature and such a mixture can also be indicated as "oil". The trans-acid content is determined in the triglycerides by the AOCS method Cd 14-61.

Preferably, the margarine fat of the present invention contains 20-60% by weight of interesterified fats and 80-40% by weight of non-interesterified fats. Particularly both the interesterified and the non-interesterified fats in the margarine fat of the present invention solely or at least for 95% consist of fats containing 80% or more of fatty acid residues with 18 carbon atoms.

A major difference with the margarine fat disclosed in the previously described British patent specification is that the margarine fat of the present invention contains substantially less interesterified fats without the draw-back of an increased tendency to sandiness, whereas the excellent melting properties of the fat blend disclosed in said British patent specification are at least maintained. Another major difference is that the interesterified fats present in the margarine fat of the present invention contain less trans-acid residues.

Preferably the fats containing at least 80% by weight of fatty acid residues with 18 carbon atoms are those which in non-hydrogenated form contain at least 40% by weight of linoleic acid, particularly sunflower oil, safflower oil, soybean oil or corn oil. Blends of one or more of such fats can of course also be used, both for the hydrogenated, the non-hydrogenated, the interesterified and non-interesterified part of the margarine fat of the present invention; however, margarine fats substantially consisting of fats of the same agricultural origin, particularly all-sunflower margarine fats, are especially preferred. The minimum content of 50% trans-acids or the maximum content of 55% of trans-acids can be achieved by hydrogenation of oils or blending hydrogenated fats such that the blend obtained fulfils the minimum or maximum trans-acid requirement.

Preferably the margarine fat contains 25-50% interesterified fats and 75-50% non-interesterified fats. The weight ratio between the hardened and non-hardened fats in the non-interesterified part is preferably from (1:1) to (1:5). Especially margarine fats are prepared in which the weight ratio between the hardened and non-hardened fats in the interesterified part is from (4:1) to (1:3).

The trans-acid containing fats can be present in both the interesterified and the non-interesterified part of the margarine fat.

Suitably fats of a trans-content of 50-70% are prepared by hydrogenating oils in a conventional iso-promoting way to semi-solid fats having a melting point e.g. between 30 and 40° C., and generally having steep temperature/dilatation curves. Such fats generally have relatively few saturated fatty acids, particularly at most 35%. The preferred range of the saturated fatty acid content is about 15 to 35%. Preferably an iso-promoting sulphur-poisoned hydrogenation catalyst is used in the hydrogenation of such oils, for example 1.5% of a sulphur-poisoned nickel catalyst precipitated on kieselguhr and the hydrogenation can be effected at temperatures varying from about 140° C. to 180° C. In this way it is possible to obtain hydrogenated high trans-containing fats containing the required proportion of trans-acids.

Fractions of hydrogenated oils can also be used to provide a fat of a trans-acid content of 50-70% suitable for the margarine fat of the invention. The fractionation treatment can be carried out by removing part of the tri-saturated glycerides and thus increasing the proportion of trans-acids, until a fraction of a sufficiently high trans-acid content is obtained.

Fats with a trans-acid content of less than 55% can be prepared by hydrogenation with freshly precipitated Nicatalysts, e.g. until a melting point of 41°-70° C. is obtained.

Margarines can be prepared by emulsifying a suitable aqueous phase in a suitable proportion in the margarine fat of the invention and chilling and working the mass in a conventional manner. The aqueous phase can contain additives which are customary for margarine, for example emulsifying agents, salt and flavours. Oil-soluble additives, e.g. flavouring compounds, vitamins, etc. can be included in the fatty phase. Generally the proportion of fatty phase in a margarine varies from about 75 to 85% of the emulsion depending on local statutory requirements for margarine. Alternatively higher proportions of the aqueous phase can be adopted in the production of so-called low-fat spreads, which can contain as little as 35,40 or 50 up to 60% by weight of fat.

The emulsions, particularly the margarine, can be manufactured in a conventional closed tubular surface-scraped exchanger as described in "Margarine" by A. J. C. Andersen and P. N. Williams, Pergamon Press 1965, p.p. 246 et seq. Votator arrangements described in British patent specification No. 639,743, British patent specification No. 650,481 and British patent specification No. 765,870 are particularly suitable. Alternatively, emulsions can be prepared by means of a phase inversion process as described in British patent specification No. 1,215,868 or on conventional cooling drums as described in the same book by Andersen and Williams.

The invention will be illustrated by the following examples:

Example I

A margarine fat was prepared from
(i) non-hydrogenated sunflower oil.
(ii) hydrogenated sunflower oil of a melting point of 32° C. and a trans-acid content of 65%.
(iii) fully hydrogenated sunflower oil of a melting point of 69° C. and a trans-acid content of less than 1%.

(ii) was prepared as follows:
2.5% of an iso-promoting nickel catalyst, poisoned by use, was suspended in the oil, free from free fatty acids. Subsequently hydrogenation was performed at 180° C. with a hydrogen input of 1 l/kg min. The progress of hydrogenation was followed by refractive index measurement. The hydrogenation was stopped at a refraction index corresponding to the required melting point and trans content.

(iii) was prepared as follows:
2.5% of a fresh nickel catalyst was suspended in the oil and hydrogenation performed as described above until the product was fully saturated.

(i) and (iii) were interesterified in a weight ratio at 65–35 as follows, to obtain the interesterified fat (iv).

The fats to be interesterified were dried to a water content of about 0.01% by weight and subsequently corandomized at 110° C. in a stirred vessel which was kept under a vacuum of 2 cm mercury, in the presence of 0.1% by weight of sodium methoxide as a catalyst. After 20 minutes the mixture was cooled and the vacuum released. The catalyst was destroyed by washing the interesterified mixture with water and dried as before.

A margarine fat was prepared by blending: 43 wt.% non-hydrogenated sunflower oil (i) with 25 wt.% (ii) and 32 wt.% of the interesterified fat (iv).

The dilatations were as follows:

| $D_{10}$ | $D_{15}$ | $D_{20}$ | $D_{25}$ | $D_{30}$ | $D_{35}$ | $D_{40}$ |
|---|---|---|---|---|---|---|
| 556 | 454 | 327 | 230 | 147 | 88 | 50 |

From the margarine fat obtained a margarine was prepared as follows:
The margarine fat blend was melted and emulsified with an aqueous phase prepared from soured milk. 0.1% of monoglycerides was added to give an emulsion containing 80% of fat.

The emulsion was crystallized and worked in a closed tubular surface-scraper heat-exchanger (Votator A-unit), which was left at a temperature of 15° C. The cooling temperatures in the A-unit were from −10° to +10° C. Subsequently the crystallized emulsion was passed through a resting tube (Votator B-unit), where it crystallized further within about 1 min. and was then liquid-filled into tubs.

Margarine samples were stored for 6 weeks at 23° C. A skilled taste panel could not observe development of sandiness.

Example II

A margarine fat was prepared from:
(i) non-hydrogenated sunflower oil.
(ii) hydrogenated sunflower oil of a melting point of 32° C. and a trans-acid content of 68%.
(iii) hydrogenated sunflower oil of a melting point of 41° C. and a trans-acid content of 50%.

(iii) was prepared as (iii) in Example I, except that the hydrogenation was stopped at a refractive index corresponding to a melting point of 41° C.

(i) and (iii) were interesterified in a weight ratio of 33:67 as described in Example I to obtain the interesterified fat (iv).

The margarine fat was obtained by blending 30 wt.% of (i), 10 wt.% of (ii) and 60 wt.% of the interesterified fat (iv).

The dilatation values were as follows:

| $D_{10}$ | $D_{15}$ | $D_{20}$ | $D_{25}$ | $D_{30}$ | $D_{35}$ | $D_{40}$ |
|---|---|---|---|---|---|---|
| 563 | 464 | 367 | 238 | 122 | 25 | — |

From the margarine fat obtained a margarine was prepared as described in Example I, which was stored for 6 weeks at 23° C. A skilled taste panel could not observe the development of sandiness.

We claim:
1. Margarine fat having a difference in dilation value at 15° and 25° C. of at least 100 and a dilation value at 35° C. of no more than 100, comprising at least 95 percent of fats containing at least 80 percent by weight of fatty acid residues with 18 carbon atoms, part of these fats being hardened and part of the non-hardened fats being interesterified with hardened fats which contain no more than 55 percent of trans-acids, such that the margarine fat contains 20–60 percent by weight of interesterified fats, and 80–40 percent by weight of non-interesterified fats the non-interesterified fats containing both non-hardened fats and fats hardened to a trans-content of 50–70 percent, the weight ratio between hardened and non-hardened fats in the non-interesterified part being from 1:1 to 1:5 and the weight ratio between the hardened and non-hardened fats in the interesterified part being from 4:1 to 1:3.

2. Margarine fat according to claim 1, containing 25–50% by weight of interesterified fats and 75–50% by weight of non-interesterified fats.

3. Margarine fat according to claim 1, in which the fats containing at least 80% by weight of fatty acid residues with 18 carbon atoms are those which in non-hydrogenated form contain at least 40% by weight of linoleic acid.

* * * * *